No. 662,732. Patented Nov. 27, 1900.
W. M. McLEISH.
ATTACHMENT FOR WATER GAGES.
(Application filed July 3, 1900.)

(No Model.)

WITNESSES:
H. G. Dieterich
Geo. G. Hosted

INVENTOR
William M. McLeish
BY
ATTORNEYS

THE NORRIS PETERS CO., PHOTO-LITHO., WASHINGTON, D. C.

UNITED STATES PATENT OFFICE.

WILLIAM MARTIN McLEISH, OF NEW ALBANY, INDIANA.

ATTACHMENT FOR WATER-GAGES.

SPECIFICATION forming part of Letters Patent No. 662,732, dated November 27, 1900.

Application filed July 3, 1900. Serial No. 22,447. (No model.)

*To all whom it may concern:*

Be it known that I, WILLIAM MARTIN MC-LEISH, a citizen of the United States, and a resident of New Albany, in the county of Floyd and State of Indiana, have invented a new and Improved Shut-Off and Alarm, of which the following is a full, clear, and exact description.

The invention relates to steam-boiler water-gages; and its object is to provide a new and improved shut-off and alarm arranged to immediately shut off the water and steam in case the gage-glass breaks and to give an alarm at the same time by blowing a whistle, and thereby calling the engineer's attention to the accident.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
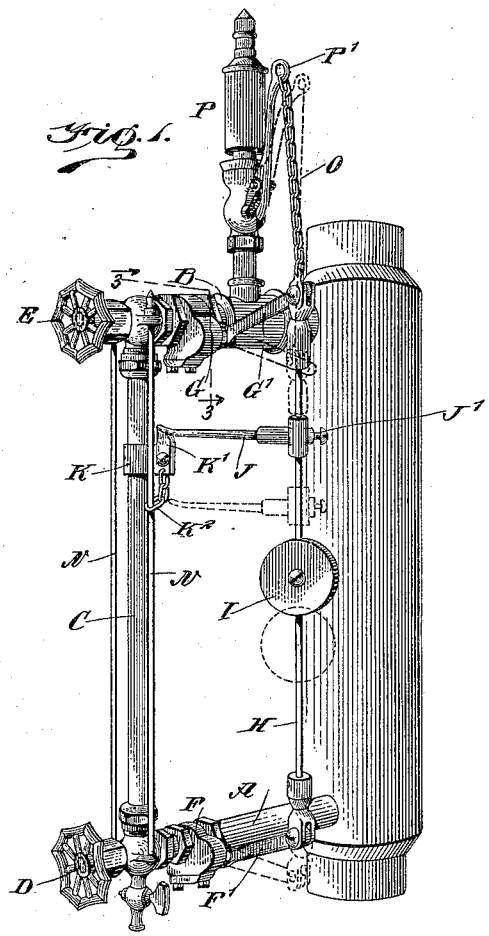
Figure 2:
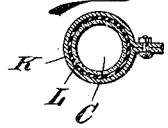
Figure 3:
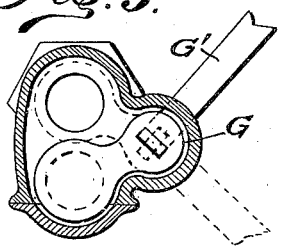

Figure 1 is a perspective view of the improvement as applied. Fig. 2 is an enlarged sectional plan view of the gage-glass and clip, and Fig. 3 is a section on line 3 3 of Fig. 1.

The water-gage on which the improvement is applied is provided with a water-inlet pipe A and a steam-inlet pipe B, connected with each other in the usual manner by a gage-glass C, said pipes being provided with the ordinary valves D and E for opening and closing the pipes whenever it is desired to insert a new glass C.

In the pipes A and B and next to the boiler are arranged cut-off valves F and G, respectively, and having the arms F' and G' of their valve-stems connected with each other by a rod H, carrying a weight I. The valves F and G may be of any approved construction; but as shown in the drawings each consists of a swinging-gate valve. (See Fig. 3.) On the rod H is adjustably secured an arm J by means of a set-screw J', and the free end of said arm is adapted to rest on a support K' in the shape of a clip K, encircling a rubber or other ring L, fitting snugly on the gage-glass C, said arm J and its support K' being arranged in such a manner that when the arm J rests on the support K' the valves F and G are in an open position. In case the gage-glass C breaks and the support K' drops from under the rod J then the weight I on the rod H causes the latter to move downward, so that a swinging motion is given to the valve-stem arms F' and G' to close the valves F and G, and thereby shut off the water and steam in the pipes A and B.

In order to prevent the clip K from being lost, a short chain $K^2$ connects the clip with one of the protecting-rods N, arranged adjacent to the gage-glass C.

In order to sound an alarm at the time the gage-glass breaks, the upper end of the connecting-rod H is connected by a chain *o* with the operating-lever P' of a whistle P of any approved construction and connected with the pipe B between the boiler and the valve G. The whistle P is normally closed; but when the rod H moves downward, as previously explained, then the chain *o* imparts a swinging motion to the operating-lever P', so that the whistle P is sounded at the time the valves F and G are closed, thus calling the attention of the engineer or other attendant to the accident.

Having thus fully described my invention, I claim as new and desire to secure by Letters Patent—

1. A water-gage, provided with shut-off valves in the steam and water inlet pipes, a weighted connection between the valves for holding the latter normally open, a support on the gage-glass and engaged by the connection, whereby the said connection will be sustained until the glass breaks, and a whistle connected with said connection, and set in operation upon the downward movement of the latter, as set forth.

2. A water-gage, provided with shut-off valves in the steam and water inlets, a weighted rod connecting the valve-stem arms with each other, an arm on said rod, and a support on the gage-glass adapted to support the free end of said arm, as set forth.

3. A water-gage, provided with shut-off valves in the steam and water inlets, a weighted rod connecting the valve-stem arms with each other, an arm on said rod, a support on the gage-glass adapted to support said arm, a whistle, and a connection between the whistle and said rod, as set forth.

4. A water-gage, provided with shut-off valves in the steam and water inlet pipes, a connection between the valves for holding the latter normally open, a support on the gage-glass for sustaining said connection until the glass breaks, a whistle connected with said connection and operated upon the downward movement of the latter, and a retaining device for connecting the said support with one of the protecting-rods of the gage so as to prevent the latter from being lost when the gage-glass breaks, as set forth.

5. A water-gage provided with shut-off valves in the steam and water inlets, said valves having arms on their stems, a weighted rod connecting the said arms, an adjustable arm on the rod and projecting toward the gage, and an adjustable support on the gage and upon which the free end of the said arm normally rests, substantially as described.

In testimony whereof I have signed my name to this specification in the presence of two subscribing witnesses.

WILLIAM MARTIN McLEISH.

Witnesses:
JOSEPH BISCOPINK,
MILLARD F. YARBROUGH.